3,264,929
CHECKING AND LOCATING DEVICE
Alexander D. F. Moncrieff, Bloomfield Hills, Mich., assignor to Michigan Tool Company, Detroit, Mich., a corporation of Delaware
Filed June 20, 1961, Ser. No. 118,402
2 Claims. (Cl. 88—14)

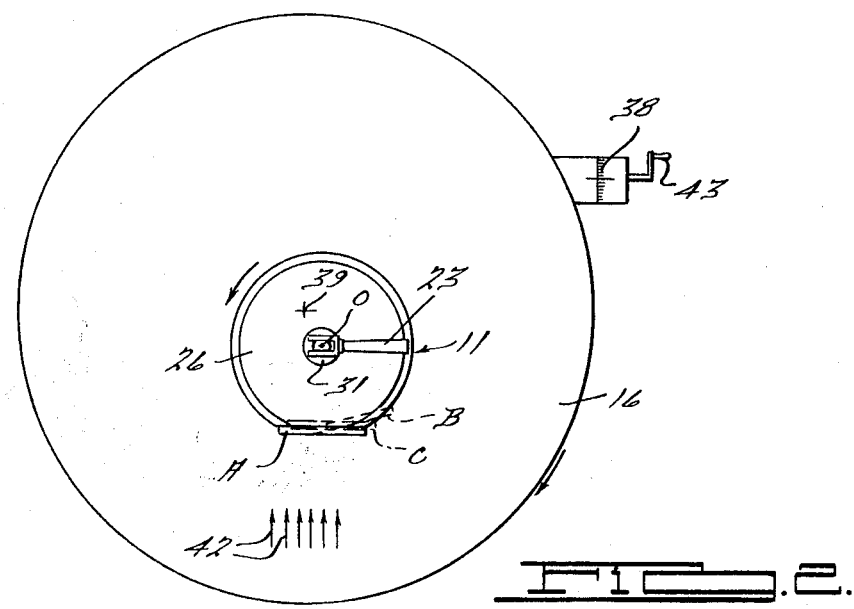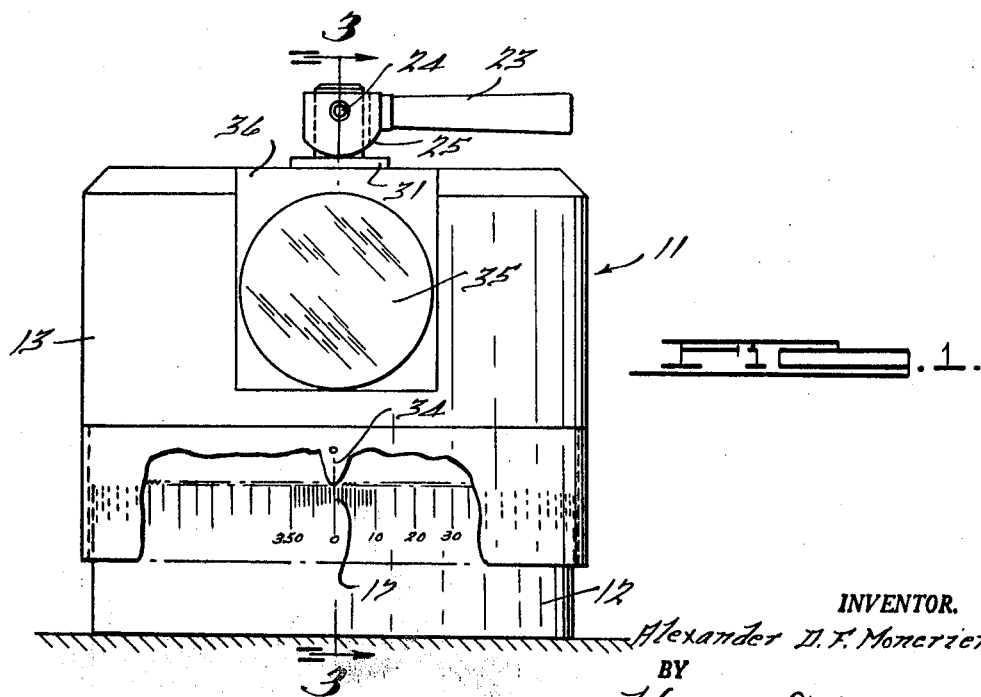

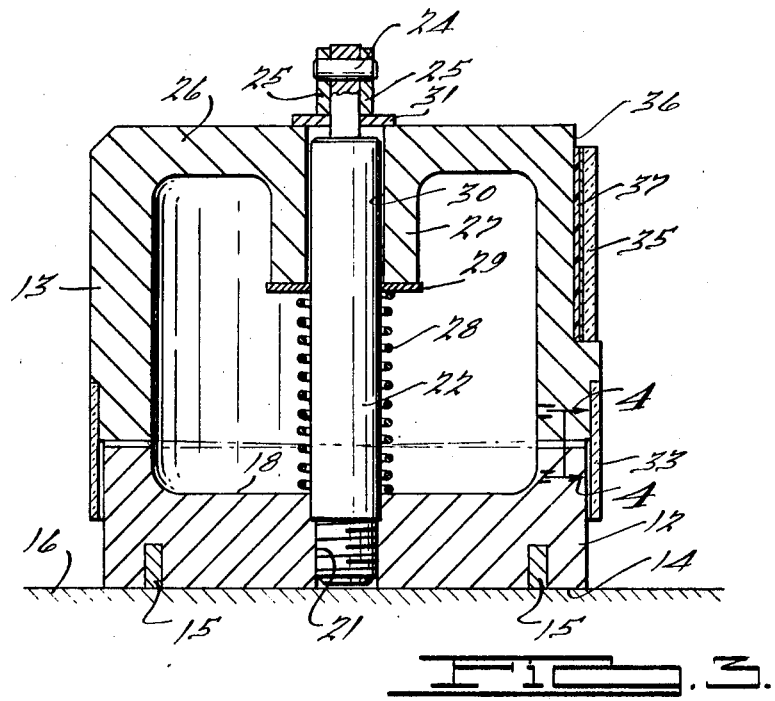

This invention relates to checking and locating devices, and more particularly to devices for checking the accuracy of settings of a rotatable object such as a table which is part of a machine tool, or to locate such an object in a predetermined angular position.

It is an object of the present invention to provide a novel and improved checking and locating device of this nature which is relatively inexpensive to manufacture, and may be used without time-consuming setup procedures.

It is a further object to provide an improved checking and locating device of this nature which by their inherent nature will furnish readings of extreme accuracy and are capable of a large number of settings.

Other objects, features, and advantages of the present invention will become apparent from the subsequent description, taken in conjunction with the accompanying drawings.

In the drawings:

FIGURE 1 is a front elevational view of the checking and locating device, parts being broken away for clarity;

FIGURE 2 is a top plan view of the device, shown with a table and a portion of a collimator and with the mirror in various positions;

FIGURE 3 is a sectional view in elevation taken along the line 3—3 of FIGURE 1 and showing the manner in which the mirror carriage is mounted on the base;

FIGURE 4 is a fragmentary cross-sectional view in elevation taken along the line 4—4 of FIGURE 3 and showing the tooth construction;

FIGURE 5 is an enlarged schematic side elevational view showing a pair of separated upper and lower teeth; and FIGURE 6 is a schematic top plan view of several base teeth, with their shapes shown in exaggerated form.

In general terms, the illustrated embodiment of the invention comprises a circular base having a large number of circumferentailly spaced upwardly facing teeth or serrations, and a mirror carriage mounted for rotation on said base and having matching downwardly facing teeth. Means are provided for lifting and lowering the carriage so as to engage and disengage the teeth, and the base and carriage are calibrated to enable setting of the carriage in any desired angular position. The teeth are equidistantly spaced and formed so as to accurately locate the carriage, and a flat mirror is mounted in a vertical plane on one side of the carriage.

The device is used in conjunction with a collimator or similar device for measuring small angular displacements and is mounted on a flat rotatable object which it is wished to position or check. The mirror is first placed in a zero displacement position with respect to the collimator, and the carriage is then rotated the desired angular distance. The object or table on which the device rests is then rotated back in the opposite direction, the degree of rotation being determined by the calibration on the table actuator if it is desired to check the accuracy of these markings. The collimator will then indicate the error in the table calibrations. If it is desired to position the table, it is rotated until the collimator will again read zero.

Referring more specifically to the drawings, the checking and locating device is generally indicated at 11 and comprises a base 12 and a mirror carriage 13 mounted thereon. Base 12 is of circular shape, having a flat underside surface 14 within which magnetic elements 15 may be mounted to securely hold the base to a table 16 on which it is being used. The cylindrical outer surface of base 12 is calibrated with markings indicated at 17 in FIGURE 1, these markings being adjacent the upper edge of the base.

The top of the base has a central depression 18 which is surrounded by a plurality of radially extending and upwardly facing teeth 19. Three-hundred-sixty such teeth are shown in the illustrated embodiment, so that carriage 13 may be positioned at 1° intervals. Teeth 19 are formed with high accuracy and are equidistantly spaced, and calibrations 17 are located so as to correspond with the teeth.

The central portion of base 12 has a central threaded aperture 21 within which is mounted a post 22. The main portion of post 22 is of cylindrical shape, and the upper end carries a handle 23 mounted thereon by a pivotal connection 24. Handle 23 carries a pair of cams 25, seen in FIGURES 1 and 3, which are used for lifting and lowering carriage 13 as will hereinafter appear.

Carriage 13 is of generally cylindrical shape, with a top portion 26 carrying an apertured central hub 27 within which post 22 extends. A helical compression spring 28 is disposed between the lower end of hub 27 and the portion of base 12 immediately surrounding post 22, this spring urging carriage 13 upwardly by engagement with a washer 29 on the underside of the hub. Bore 30 of hub 27 is of larger diameter than post 22 so that carriage 13 may be accurately located by interengagement of the base and carriage teeth as will hereinafter appear. A second washer 31 mounted on top 26 is engageable by cams 25, the latter being so shaped that when handle 23 is in its horizontal position as shown in FIGURE 1, carriage 13 will be forced downwardly, whereas counterclockwise swinging of handle 23 to the vertical position in FIGURE 1 will permit spring 28 to lift the carriage.

In its lower position, a plurality of teeth 32 formed on the underside of the carriage engage teeth 19, whereas these teeth will be disengaged in the upper carriage position. Teeth 32 are formed as counterparts of teeth 19 so as to accurately interfit therewith when handle 23 is moved to its horizontal position in FIGURE 1. Teeth 19 and 32 are preferably constructed in a tapered fashion, as indicated in FIGURES 3, 5 and 6, so as to cause carriage 13 to be exactly concentric with base 12 whenever the teeth are moved into engagement. More particularly, the flat flanks of teeth 19 and 32 flare outwardly from a theoretical apex on centerline 0 of the base, which approximately coincides with the central axis of post 22. The apices of teeth 19 and 32 are preferably relieved to insure full contact of the tooth flanks when they are brought into engagement. A transparent skirt 33 is secured to the lower portion of carriage 13 immediately outwardly of teeth 32, this skirt carrying a zero marking indicated at 34 in FIGURE 1 so as to facilitate the setting of carriage 13 with respect to base 12.

A mirror 35 is mounted on one side of carriage 13 directly above zero marking 34. Mirror 35 is preferably but not necessarily mounted in an exact vertical plane by providing a flat portion 36 on carriage 13, and securing the mirror to this flat portion by an adhesive material 37. In one suitable method for mounting the mirror, a collimator is first accurately positioned by means of a conventional optic square (not shown), and the optic square then replaced by device 11 with adhesive 37, for example a slowly setting plastic material, still in its soft condition. Mirror 35 may then be finally set by means of the collimator.

In operation, let us assume that the calibrations 38 (FIGURE 2) for adjusting table 16 are to be checked. Device 11 is placed on table 16 in the vicinity of the center 39 thereof. It is not necessary that the axis 0 of device 11 exactly coincide with center 39 of the table, but only that these two centers be close enough so that mirror 35 will still be in the line of vision of the collimator 41 or other angularity measuring device which is used.

A collimator which may be used in conjunction with the invention uses a parallel beam of light 42 together with a vertically disposed target wire, the reflected image of the target wire being used in conjunction with a scale within the collimater for indicating small angular displacements about a vertical axis. The distance of this type of collimator from the mirror is not important.

The operation of checking the accuracy of calibrations 38 may be carried out by first rotating carriage 13 on base 12 so that zero mark 34 coincides with the zero mark of scale 17. Handle 23 is then lowered to its horizontal position, interlocking carriage 13 with the base. Scale 38 is then set at zero and device 11 adjusted on table 16 until mirror 35 is in position A shown by solid lines in FIGURE 2, that is, exactly at right angles to the parallel light rays indicated by arrows 42 in FIGURE 2. Collimator 41 is also adjusted about a horizontal axis so as to bring the light rays into a right angle relationship with the mirror plane. The fact that mirror 35 may not be exactly in a vertical plane, that is, parallel to axis 0, will thus not detract from the operability of the device.

Handle 23 is then lifted to its vertical position, permitting spring 28 to lift carriage 13 away from base 12, disengaging teeth 32 from teeth 19. Note that this manipulation requires no manual contact with the carriage or base which might disturb its setting. Carriage 13 is then manually grasped and carefully rotated until zero mark 34 is, say, at the 10° mark on scale 17. During this rotation base 12 will be undisturbed because of the minimum amount of friction contact between the carriage and base, as well as the gripping action exerted on the table by base-carried magnetic elements 15. Handle 23 is then again swung to its horizontal position, interlocking teeth 32 with teeth 19. Mirror 35 will at that point be in a position indicated by dash lines at B in FIGURE 2. Due to the previously described construction of teeth 19 and 32, it will be assured that mirror 35 will have rotated exactly 10° from its initial position.

Handle 43 which drives table 16 and scale 38 is then rotated so as to drive table 16 in a clockwise direction about center 39. This movement is continued until scale 38 is set at 10°. Mirror 35 will then be in the position indicated by dot-dash lines at C in FIGURE 2.

If scale 38 is accurately calibrated, that is, if table 16 has been rotated clockwise exactly 10°, position C of mirror 35 will be exactly parallel to position A, and collimator 41 will show a zero error. If, however, calbirations 38 are in error, that is, if table 16 has not been rotated exactly 10° in a clockwise direction, this error may be exactly determined by referring the reflected image of the wire within the collimator to its scale. This same process may of course be carried out with other angular settings.

If instead of checking the accuracy of calibrations 38, it is desired to rotate table 16 a predetermined angular distance, the same procedure may be carried out, with the following exception: When handle 43 is rotated to bring mirror 35 back from position B to position C, the degree of rotation will not be determined by the setting of scale 38 but by the relocation of the reflected collimator wire image at its zero position. If handle 43 is turned until the reflected wire image again arrives at its zero position on the scale (as it was in position A), table 16 will have been rotated to exactly the same angularity as zero marker 34 was previously set on scale 17.

It will be apparent that device 11 could be used in conjunction with additional indexing and locating apparatus, such as that shown and described in copending application Serial No. 129,479 filed by me on August 2, 1961, now Patent No. 3,146,640 and assigned to the assignee of the present application.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a checking and locating device, a base having a first set of equidistantly spaced circularly arranged teeth, carriage having a second set of equidistantly spaced circularly arranged teeth adapted to interlock with said first set, means for moving said carriage between a disengaged position in which the two sets of teeth are separated and a locked position in which the two sets of teeth are engaged, said teeth being so formed as to maintain concentricity between the two sets of teeth when the teeth are fully engaged irrespective of the relative angular positions of the carriage and base, an upstanding post on said base, said carriage being of a generally circular shape loosely mounted on said post and carrying a reflecting surface, said moving means comprising a helical compression spring on said post urging said carriage toward a disengaged position, a manually actuatable cam mounted on the upper end of said post for moving said carriage to its engaged position, a scale on said base calibrated to correspond with said teeth, and a zero mark on said carriage for cooperation with said scale.

2. The combination according to claim 1, said teeth being formed with flat flanks flaring radially outwardly from a common theoretical apex when in their engaged position.

References Cited by the Examiner

UNITED STATES PATENTS

| | | | |
|---|---|---|---|
| 2,202,117 | 5/1940 | Muller | 74—826 X |
| 2,437,807 | 3/1948 | Dowell et al. | |
| 2,445,792 | 7/1948 | Lunney | 88—74 |
| 2,481,551 | 9/1949 | Williams | 88—1 |
| 2,520,866 | 8/1950 | Wells | 88—14 |
| 2,701,501 | 2/1955 | Cuny | 88—14 |
| 2,763,932 | 9/1956 | McMillan | 88—14 |
| 2,849,911 | 9/1958 | Brunson | 88—14 |
| 3,002,279 | 10/1961 | Miller | 88—14 X |
| 3,056,207 | 10/1962 | Brault | 88—14 X |
| 3,117,178 | 1/1964 | Webber | 88—14 X |

FOREIGN PATENTS

| | | |
|---|---|---|
| 568,936 | 4/1945 | Great Britain. |
| 321,156 | 6/1957 | Switzerland. |

JEWELL H. PEDERSEN, *Primary Examiner.*

EMIL G. ANDERSON, *Examiner.*

T. L. HUDSON, *Assistant Examiner.*